(12) United States Patent
Pottier

(10) Patent No.: US 10,486,168 B2
(45) Date of Patent: Nov. 26, 2019

(54) FLOTATION PROCESS AND FACILITY FOR THE IMPLEMENTATION THEREOF

(71) Applicant: KADANT LAMORT, Vitry-le-francois (FR)

(72) Inventor: Stephan Pottier, Frignicourt (FR)

(73) Assignee: KADANT LAMORT, Vitry-le-francois (FR)

( * ) Notice: Subject to any disclaimer, the term of this patent is extended or adjusted under 35 U.S.C. 154(b) by 743 days.

(21) Appl. No.: 15/102,465

(22) PCT Filed: Oct. 24, 2014

(86) PCT No.: PCT/FR2014/052718
§ 371 (c)(1),
(2) Date: Jun. 7, 2016

(87) PCT Pub. No.: WO2015/059429
PCT Pub. Date: Apr. 30, 2015

(65) Prior Publication Data
US 2016/0310965 A1    Oct. 27, 2016

(30) Foreign Application Priority Data

Oct. 25, 2013  (FR) .................... 13 60439

(51) Int. Cl.
*B03D 1/14*    (2006.01)
*D21B 1/32*    (2006.01)
*B03D 1/24*    (2006.01)

(52) U.S. Cl.
CPC ......... *B03D 1/1493* (2013.01); *B03D 1/1412* (2013.01); *B03D 1/24* (2013.01); *D21B 1/327* (2013.01)

(58) Field of Classification Search
CPC ...... B03D 1/1493; B03D 1/1412; B03D 1/24; D21B 1/327; Y02W 30/646
See application file for complete search history.

(56) References Cited

U.S. PATENT DOCUMENTS

| 5,897,772 A * | 4/1999 | Chiang ................. | B01D 17/00 210/221.2 |
| 5,979,665 A * | 11/1999 | Serres .................... | D21B 1/325 209/168 |
| 2013/0105366 A1* | 5/2013 | Britz ...................... | D21B 1/327 209/133 |

FOREIGN PATENT DOCUMENTS

| EP | 0 674 040 A1 | 9/1995 | |
| FR | 2 963 627 A1 | 2/2012 | |
| FR | 2963627 A1 * | 2/2012 | ............... D21B 1/32 |

* cited by examiner

*Primary Examiner* — James C Goloboy
(74) *Attorney, Agent, or Firm* — Craft Chu PLLC; Andrew W. Chu

(57) ABSTRACT

The serial multistage flotation process for eliminating hydrophobic particles from a stream of materials to be treated includes a step of introducing into one stage a layer of materials to be treated, originating either from a higher state or directly from the inlet of the system. There is an aeration step in which air extracted from the lower stages is mixed, diffused and dispersed in the layer of materials to be treated then escapes to the higher stage or to a foam discharge zone. After the aeration step, there is a deaeration step in which air is no longer introduced into the layer of materials to be treated before the departure thereof from one stage and that enables the discharge of the dispersed air to the higher stages or in the case of the highest stage to foam discharge zone. There is also a step of recovering the deaerated material.

17 Claims, 1 Drawing Sheet

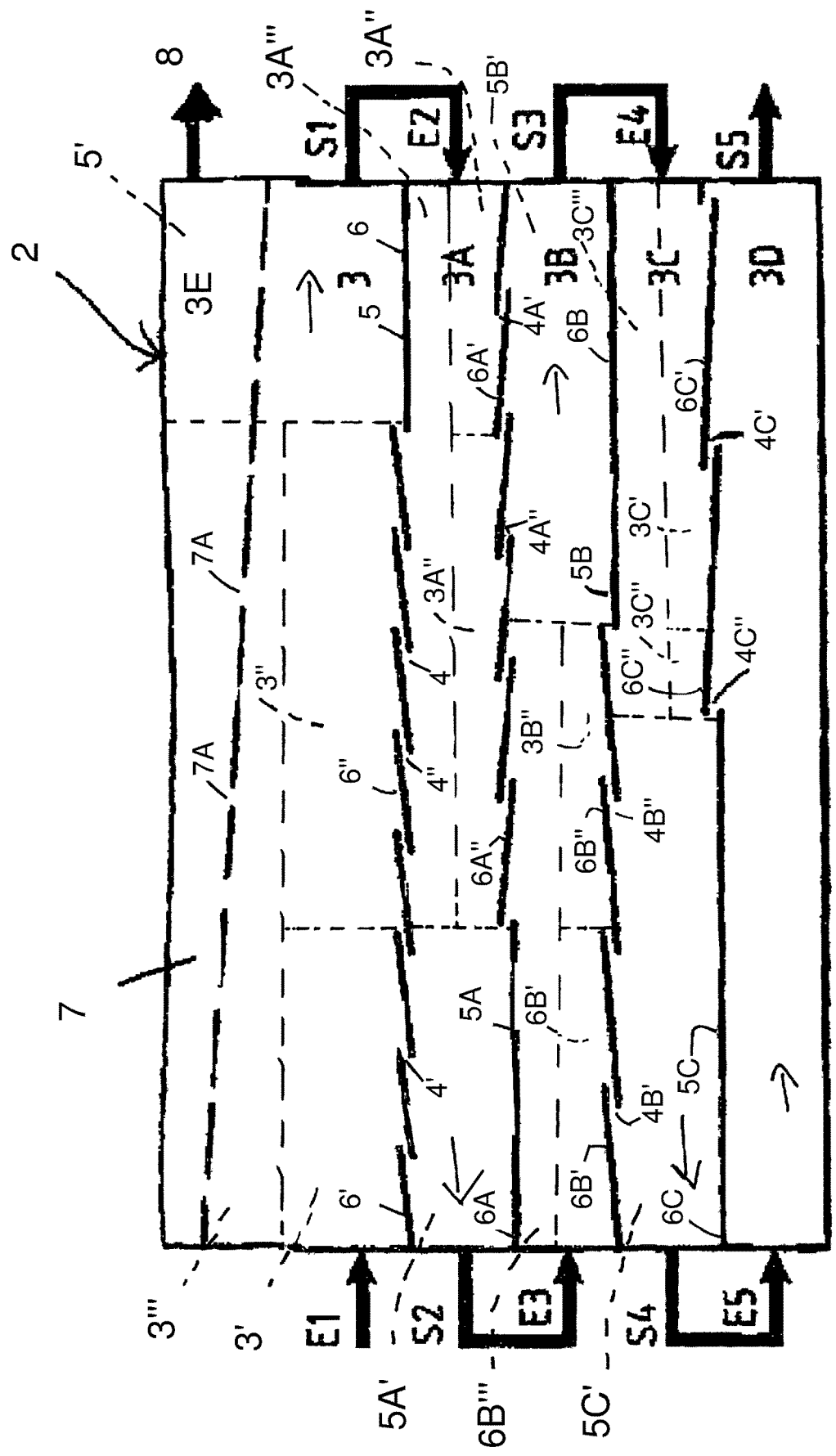

FLOTATION PROCESS AND FACILITY FOR THE IMPLEMENTATION THEREOF

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a serial multistage flotation process for eliminating hydrophobic particles from a stream of materials to be treated, and a facility for the implementation of said process.

Such an invention may in particular be applied to deinking for recycling old paper or to the elimination of hydrophobic substances present in certain streams coming from blank pulps or the like (cotton, etc.), or in water originating from the implementation of industrial processes.

2. Description of Related Art Including Information Disclosed Under 37 CFR 1.97 and 37 CFR 1.98.

Quite particularly, old or recovered paper may be recycled into new paper using facilities making it possible to scrub this old paper.

Typically, the process implemented by these facilities first consists of mixing this old paper with water in a pulper, while adding appropriate chemical agents thereto. The paper is then disaggregated mechanically and the cellulose fibers are placed in an aqueous suspension before the various operations take place aiming to release its different contaminants. Thus, principles of separation by density deviation are applied to separate the heavy components from the light components. Likewise, filtration means are frequently used to separate the particles based on their sizes. Thus, for example, pressurized purifiers may be used with sieves with openings or holes, or canvas washers, to perform this function. Lastly, dispersed air flotation cells take advantage of the distinct hydrophobic properties of the components present to separate them.

The various aforementioned operations are typically performed one after the other along a treatment line sized to treat the overall flow rate of paper pulp.

In a more specific case of recycling inked paper (newspaper, magazine, office paper, etc.), the removal of the ink as a contaminant is a high priority: this is the "deinking" process. This ink is deposited on the surface of the paper during its printing. If this surface of the paper is only made up of fibers, the ink will be deposited thereon. Conversely, if this surface of the paper includes a layer of fillers (calcium carbonate, kaolin, etc.), the ink will be deposited on the latter and not directly on the fibers.

Although there are multiple printing processes (offset, heliography, flexography, etc.) on various paper media, they all have consequences for the deinking operations during recycling of the paper.

Whatever the case may be, during pulping of the recycled paper, the components of the paper separate by hydration and mechanical impacts. Among these components, it is possible to distinguish: cellulose fibers, whether long, medium or short, fines, essentially made up of fragments of cellulose too small to be qualified as fibers, mineral fillers and contaminants, which are for example particles of plastic, sawdust spots, inks and stickies, which are various fractionated or re-agglomerated residues, as well as chemical components present in the raw material and/or added during the process for manufacturing the treated material.

The inks do not fragment completely, and depending on the case, the operating mode changes.

The ink disaggregated into small particles can easily be eliminated by flotation or washing. Conversely, flotation is less effective on ink having remained in the form of large particles, called black points, or in micronized or even dissolved form. Document FR 2,963,627 discloses a pretreatment solution, making it possible to perform such a reduction in a parallel process, then to reunite the whole in a same flotation process.

Different techniques are currently implemented to eliminate the ink particles by flotation. In this respect, known from document EP 0,674,040 is a paper pulp deinking process in which a stream of paper pulp is circulated from top to bottom and, in the reverse direction, from bottom to top, a stream of air bubbles, knowing that the mass of paper pulp experiences successive recycling steps in the stages situated above one another in a same cell.

In short, the stream of air bubbles, injected at the bottom of the cells, crosses successively, in each stage, through the mass of paper pulp, which enters at a stage through an inlet to be removed therefrom down below at an outlet, in order to be reinjected up high at the inlet of the following stage placed immediately below it.

Pumps perform this recovery of the paper pulp at each stage, knowing that a new injection of air may also take place at this level, if necessary.

In the upper part of the cell, the foam is recovered that has formed therein and that has driven the hydrophobic particles, including the ink.

Such flotation cells have proven particularly effective and have a high performance compared with facilities including, for each flotation stage, separate treatment units installed side by side.

Document FR 2,963,627 further discloses a similar flotation process in a device that is no longer circular, but in an elongated rectangular shape, which we will call linear process as opposed to the circular process, including a parallelepiped enclosure that is subdivided into horizontal stages, using separators with openings through which the air bubbles from a lower stage can penetrate the higher stage in order to cross through the stream of materials circulating in the latter.

Specifically, at each stage, the stream of materials penetrates at an inlet orifice at a side end of the flotation unit to leave it at an outlet orifice at the opposite side end and reach, at that same side end and through an inlet orifice, the following stage, and so forth.

In order to optimize the ability to eliminate hydrophobic particles, it is necessary to perform successive aerations of the material for example using Venturi effect injectors, knowing that the air addition capacity of the injector is greatly reduced if residual air is present in the material before injection.

BRIEF SUMMARY OF THE INVENTION

The present invention aims to improve facilities for eliminating hydrophobic substances present in a stream of materials to be treated, in particular a stream of old paper, owing to the implementation of an optimized treatment process.

Thus, in the context of an inventive approach, a treatment process is considered providing, at the end of each treatment step on a stage, a deaeration step without additional aeration from subsequent stage(s) of the material to be treated.

The objective of this additional step is to best prevent certain air bubbles from penetrating the layer of material to be treated at a stage, and remaining trapped in the material to be treated to return to the lower stage by passing through the injector. Indeed, as they rise in the stages, the air bubbles are increasingly charged with ink, which causes their effectiveness in capturing additional ink to decrease. Conversely, the material to be treated becomes increasingly clean as it descends in the stages. Thus, an air bubble driven downward with the material to be treated would pollute the lower stage, and thus reduce the overall performance.

In a second inventive approach, it has been considered to take advantage of a linear staged flotation facility, to carry out the process according to the invention.

It is in fact by going against the practices by one skilled in the art, preferring to pulse air through openings distributed over the entire stage, to control the penetration of air in the material to be treated, that one has considered keeping a zone preceding the outlet for the material to be treated of each stage with a tight floor or floor sealed to openings from a lower stage or sealed floor portion of the separator. The length of this tight floor or sealed floor portion is defined with the aim of allowing the very large majority of the air bubbles having penetrated the openings of the separator in the material to be treated to have time to cross through the layer of material before the latter is sent into the stage below through a new injector. A separator according to the state of the art is provided with openings closer to the higher stages to allow the passage of a larger quantity of air. It is clear that between two openings, the separator is tight or sealed between stages. The notion of a tight floor or sealed floor portion at the stage outlet must therefore be understood as a configuration allowing a travel time without introducing air bubbles in the material before it leaves a stage allowing the very large majority of material to be deaerated or allowing most air bubbles to be removed from the material before being injected to the next stage. For example, the length of the tight floor or sealed floor portion will be significantly greater than the distance between two consecutive openings in the separator, in particular at least two times greater or even six times greater.

To that end, the invention relates to a serial multistage flotation process, preferably linear, for eliminating hydrophobic particles, including a step of introducing, into a stage, a layer of material to be treated, coming either from a higher stage or directly from the inlet of the system, the process including an aeration step in which the air extracted from the lower stages is mixed, diffused and dispersed in the layer of materials to be treated, then escapes to the higher stage or to a foam discharge zone. The process includes, after the aeration step, a deaeration step in which air is no longer introduced into the layer of materials to be treated before the departure thereof from one stage and that enables the discharge of the dispersed air to the higher stages or, in the case of the highest stage, to a foam discharge zone, and a step of recovering the deaerated material.

Owing to these arrangements, one obtains improved deaeration at said stage, which reduces the quantity of free inks and adhesives recycled toward the lower stage, and in fine allows better elimination of unwanted particles.

The invention in particular applies to a linear process, but could also be implemented in a circular process.

According to one preferred embodiment of the invention, at each higher stage, the duration of the deaeration step may be at least 20% of the duration of the aeration step, imparting controlled deaeration to the process.

The invention also relates to a multistage flotation facility for implementing the process as previously described, including an enclosure vertically subdivided into stages at each of which a stream of materials to be treated penetrates at an inlet orifice situated at a side end of the enclosure, to leave therefrom at an outlet orifice, each higher stage including a separator with openings arranged to allow air bubbles originating from the immediately lower stage to pass. The facility further includes a foam discharge zone topping the different stages and communicating with the latter and with a discharge opening. At least one higher stage includes a tight floor or sealed floor portion or floor sealed to openings from a lower stage, adjacent to its outlet. The tight floor or sealed floor portion is configured to allow a travel time of the layer of material without insertion of air in the layer of old paper to be treated before it leaves a stage.

Owing to these arrangements, one obtains improved deaeration at each stage, which reduces the quantity of hydrophobic substances recycled toward the lower stage, in particular such as free inks and adhesives.

According to other features of the facility according to the invention:
- the length of the sealed floor portion can correspond to at least 20% of the length of said separator with openings, allowing an optimized deaeration,
- the length of the tight floor or sealed floor portion is greater than the length comprised between two consecutive openings of the separator with openings.
- the length of the tight floor or sealed floor portion is at least two times greater than the length comprised between two consecutive openings of the separator with openings.

Furthermore, according to one preferred alternative embodiment, the number of openings included by a separator with openings increases rising up the stages, so as to allow an optimal discharge of air, the propagation of which increases rising up the stages. Furthermore, the fact that the number of openings is maximal at the separator with openings of the higher stage makes it possible to distribute and diffuse the air homogenously over the entire surface of the enclosure, thus ensuring a homogenous formation of foams, and consequently an optimized operation of the foam discharge zone.

Furthermore, the openings of a separator with openings can have a size and geometry such that they allow an optimal aspiration of air originating from a lower stage.

To that end, the separators with openings of the higher stages can be offset relative to one another so as to obtain said geometry of said openings.

Such a structure advantageously makes it possible to create a speed differential of materials to be treated between two consecutive stages, and consequently to create, by "Venturi" effect, a homogenous aspiration of the air originating from lower stages.

According to one additional feature of the invention, the foam discharge zone includes a foam collector able to collect and discharge only the upper part of the foams.

Furthermore, the collector can preferably have an incline. This makes it possible to ensure a homogenous and non-preferential discharge of the foams over the entire surface of the enclosure and to prevent the presence of dead zones, due to the increase in the flow rate of the foams in the collector as one comes closer to the foam discharge opening of the enclosure.

One additional feature of the facility according to the invention is also defined by the fact that each higher stage may include a tight floor or sealed floor portion adjacent to its outlet, thus optimizing the deaeration of each upper stage.

Advantageously, the length of the tight floors or sealed floor portions can increase when descending the stages, thus allowing a deaeration of growing quality over the course of the treatment.

Other aims and advantages of the present invention will appear during the following description, relative to one example embodiment provided for information and non-limitingly.

BRIEF DESCRIPTION OF THE SEVERAL VIEWS OF THE DRAWINGS

The understanding of this description will be facilitated in reference to the attached drawing.

The FIGURE is a diagrammatic illustration of a facility implementing this process.

DETAILED DESCRIPTION OF THE INVENTION

As shown in the diagram of the attached FIGURE, the present invention is for example applicable in the field of treating old paper for recycling thereof.

Thus, the invention more particularly relates to a part of the process for separating hydrophobic particles.

In this regard, the facility consists of a flotation unit 1, taking advantage of the more or less hydrophobic nature of the particles present to remove some of them, for example the ink and adhesives particles.

The same principle applied in such a flotation unit 1 consists, preferably, of having the stream of materials to be treated entering this flotation unit 1 pass through a stream of air bubbles which, in contact with hydrophobic particles, drives the latter. The material to be treated may for example consist of old paper, for recycling thereof. The material to be treated may also consist of a stream of water from the implementation of industrial processes, for example water originating from paper recycling processes or any other type of process and containing hydrophobic particles to be eliminated.

This flotation unit 1 consists of a cell arranged longways including a parallelepiped enclosure 2 vertically subdivided into stages 3, 3A, 3B, 3C, 3D by means of separators 6 with openings 4 through which the air bubbles of a lower stage 3A, 3B, 3C, 3D can penetrate in the higher stage 3, 3A, 3B, 3C and cross through the stream of material to be treated circulating in the latter.

Specifically, at each stage 3, 3A, 3B, 3C, the stream of material to be treated penetrates at an inlet orifice E1, at a side end of the floatation unit 1 to leave it at an outlet orifice S1, at the opposite side end, and reach, at that same side end and by means of an inlet orifice E2, the following stage 3A and so forth, until it is discharged through the outlet orifice S5 of the lowest stage 3D.

Each stage comprises four separate zones:

Aeration zone: Mixing, diffusion and dispersion of the air on the material to be treated.

Mixing zone: Driving and mixing bubbles originating from the lower stage and accumulation of bubbles in the upper part.

Bubble discharge zone or discharging zone: Driving and mixing bubbles originating from the lower stage and discharging bubbles toward the higher stage or toward a foam accumulation zone.

Deaeration zone: Discharge of the residual bubbles toward the higher stage.

The mixing zone of each stage is situated above the deaeration zone of the lower zone and the bubble discharge zones are situated above one another:

a first separator 6 has a first aeration portion 6' having first aeration and mixing openings 4', a first mixing and discharge portion 6" having first mixing and discharge openings 4", and a first sealed floor portion 5, said first mixing and discharge portion being between said first sealed floor portion and said first aeration portion, wherein said first aeration portion defines a first aeration zone 3' of said first stage 3, wherein said first mixing and discharge portion defines a first mixing zone 3" of said first stage, wherein said first aeration zone and said first mixing and discharge portion defines a first discharging zone 3''' of said first stage 3, and wherein said first sealed floor portion defines a first deaeration zone 5' of said first stage 3, a second separator 6A has a second aeration portion 6A' having second aeration and mixing openings 4A', a second mixing and discharge portion 6A" having second mixing and discharge openings 4A", and a second sealed floor portion 5A, said second mixing and discharge portion being between said second sealed floor portion and said second aeration portion, wherein said second aeration portion defines a second aeration zone 3A' of said second stage 3A, wherein said second mixing and discharge portion defines a second mixing zone 3A" of said second stage, wherein said second aeration zone and said second mixing and discharge portion defines a second discharging zone 3A''' of said second stage 3A, and wherein said second sealed floor portion defines a second deaeration zone 5A' of said second stage 3A, a third separator 6B has a third aeration portion 6B' having third aeration and mixing openings 4B', a third mixing and discharge portion 6B" having third mixing and discharge openings 4B", and a third sealed floor portion 5B, said third mixing and discharge portion being between said third sealed floor portion and said third aeration portion, wherein said third aeration portion defines a third aeration zone 3B' of said third stage 3B, wherein said third mixing and discharge portion defines a third mixing zone 3B" of said third stage, wherein said third aeration zone and said third mixing and discharge portion defines a third discharging zone 3B'" of said third stage 3B, and wherein said third sealed floor portion define a third deaeration zone 5B' of said third stage 3B, a fourth separator 6C has a fourth aeration portion 6C' having fourth aeration and mixing openings 4C', a fourth mixing and discharge portion 6C" having fourth mixing and discharge openings 4C", and a fourth sealed floor portion 5C, said fourth mixing and discharge portion being between said fourth sealed floor portion and said fourth aeration portion, wherein said fourth aeration portion defines a fourth aeration zone 3C' of said fourth stage 3C, wherein said fourth mixing and discharge portion defines a fourth mixing zone 3C" of said fourth stage, wherein said fourth aeration zone and said fourth mixing and discharge portion defines a fourth discharging zone 3C'" of said fourth stage 3C, and wherein said fourth sealed floor portion define a fourth deaeration zone 5C' of said fourth stage 3C.

The FIGURE also shows a fifth stage 3D at the bottom of the enclosure 2 and a foam collection stage 3E at the top of the enclosure 2 defined by the foam collector 7 with foam collector openings 7A. The first inlet orifice E1 is in fluid connection with the first aeration zone 3'. The first outlet orifice S1 is in fluid connection with the first deaeration zone 5' so as to flow material through the first stage 3 from the first inlet orifice E1 to the first outlet orifice S1. The second inlet orifice E2 is in fluid connection with the second aeration zone 3A' and the first outlet orifice S1. The second outlet orifice S2 is in fluid connection with the second deaeration zone 5A' so as to flow material through the second stage 3A from the first second orifice E2 to the second outlet orifice S2. There is a last outlet orifice S5 being in fluid connection with the second outlet orifice so as to flow material through the enclosure 2. In some embodiments, there are additional stages, such as third stage 3B with a third inlet orifice E3 and a third outlet orifice S3 with the analogous fluid connections to the second stage 3C and a fourth stage 3C with a fourth inlet orifice E4 and a fourth outlet orifice S4 with the analogous fluid connections to the third stage 3B. The first mixing zone 3" is above the second deaeration zone 5A'; the second mixing zone 3A" is above the third deaeration zone 5B'; and the third mixing zone 3B" is above the fourth deaeration zone 5C'. The first discharging zone 3'" is above the second discharging zone 3A'"; the second discharging zone 3'A" is above the third discharging zone 3B'"; and the third discharging zone 3B'" is above the fourth discharging zone 3C'".

According to the invention, at least one, and preferably each higher stage 3, 3A, 3B, 3C also includes a tight floor 5 or sealed floor portion 5, 5A, 5B, 5C, corresponding to each deaeration zone 5', 5A', 5B', 5C', being positioned adjacent to and in fluid connection with respective outlets S1, S2, S3, S4. The inlet orifices E1, E2, E3, E4 are in fluid connection with respective aeration zones 3', 3A', 3B', 3C' and mixing zones 3", 3A", 3B", 3C". Thus, during the transit of the material to be treated in a higher stage 3, 3A, 3B, 3C, the material receives air bubbles coming from the immediately lower stage 3A, 3B, 3C, 3D in the mixing and bubble discharge zones as long as it is on the separator 6 with openings. That is, the first mixing zone 3" is in fluid connection with said second discharging zone 3A'" through the first aeration openings 4' and said first inlet orifice E1. Furthermore, the first discharge zone 3'" is in fluid connection with said second discharge zone 3A'" through said first mixing and discharge openings 4" and said first mixing zone 3". These air bubbles, after a residence time in the material to be treated, escape upward. Next, on the tight floor or sealed floor portion 5, the material no longer receives air bubbles, the air bubbles still contained in the material to be treated continuing to escape upward. That is, the first deaeration zone 5' is sealed to second stage 3A, such that there are no openings for fluid connection to the second discharge zone 3A'". The first deaeration zone 5' is in fluid connection with the outlet orifice S1. One thus obtains a final zone (deaeration zone) for deaeration without re-aeration at each higher stage. That is, no more fluid connectivity for "old" air bubbles to continue floating into the first deaeration zone 5" so that the material has a chance to separate or deaerate air bubbles from the materials without adding any more "old" air bubbles from other sources. A higher stage 3, 3A, 3B, 3C can be qualified as higher if it is positioned above another stage, and lower 3A, 3B, 3C, 3D if it is positioned below another stage. The third stage 3B is a lower stage 3B relative to the second stage 3A. For the illustrated example with five stages, the bottom stage 3D is a lower stage, the intermediate stages 3A, 3B, 3C are simultaneously higher and lower stages, and the top stage 3 is an upper stage.

It is possible to size the tight floor or sealed floor portion 5 taking into account the residence time of the air bubbles in the thickness of material to be treated, while looking for the most complete possible deaeration. Nevertheless, all of the air bubbles do not cross through a layer of material to be treated at the same speed, and if one wished to guarantee total deaeration, the length of the tight floor 5 would be excessive, and would be excessively expensive. That is, the length of the sealed floor portion 5 relative to the length of the separator 6 can be set to determine the size of the deaeration zone 5'. A longer sealed floor portion 5 creates a larger deaeration zone 5'. The present invention can conceive of a deaeration zone 5' large enough to completely deaerate all air bubbles, including the very slow air bubbles; however, it is very impractical to make the sealed floor portion 5 that long to accommodate these very slow air bubbles. A compromise is therefore sought between the quality of deaeration and the cost of the facility and the overall residence time of the material to be treated. The advantage provided by the present invention becomes substantial once a second deaeration step is indeed present.

At the facility of the present invention, the length of the tight floor sealed floor portion 5 must be significantly greater than the distance comprised between two successive openings 4, such as the first aeration and mixing openings 4' or the first mixing and discharge openings 4", on the separator 6 with openings 4, preferably at least two times greater than this distance, for example six times this distance.

Typically, the distance comprised between two adjacent openings 4, such as the first aeration and mixing openings 4' or the first mixing and discharge openings 4", is larger in the lower stages, and smaller in the higher stages. That is, the first aeration and mixing openings 4' and the first mixing and discharge openings 4" are closer to each other than the second aeration and mixing openings 4A' and the second mixing and discharge openings 4A". As such, the second aeration and mixing openings 4A' and the second mixing and discharge openings 4A" are closer to each other that the third aeration and mixing openings 4B' and the third mixing and discharge openings 4B". This makes it possible to add air bubbles to each stage, the openings 4 that are closer together then making it possible to allow a greater air flow rate to pass. According to one preferred embodiment of the present invention, it is also possible to have a tight floor or sealed floor portion 5 that becomes longer as one goes down the stages 3, 3A, 3B, 3C, and therefore to have a tight floor or sealed floor portion 5 that is shorter at the high stages, and a longer tight floor or sealed floor portion 5 at the lower stages. One thus obtains increasingly complete deaeration over the course of the treatment of the materials to be treated.

For example, at the stage 3, the length of the tight floor or sealed floor portion 5 may be approximately 30% of the length of the separator 6 with openings 4, while at the stage 3C of FIG. 1, the length of the tight floor or sealed floor portion 5 can reach a value identical to the length of the plate 6 with openings 4, to ensure that a maximum quantity of air bubbles charged with ink has indeed had the time to discharge material to be treated, before steering the material to be treated toward the stage 3D, which is the lowest stage, and the last for treatment. Clean air is then introduced at the stage 3D, which ensures optimal cleanliness for the material leaving the facility 1.

The invention claimed is:

1. A multistage flotation facility, comprising:
    an enclosure being comprised of a first stage and a second stage;
    a first separator being comprised of a first aeration portion having first aeration and mixing openings, a first mixing and discharge portion having first mixing and discharge openings, and a first sealed floor portion, said first mixing and discharge portion being between said first sealed floor portion and said first aeration portion,
    wherein said first aeration portion defines a first aeration zone of said first stage, wherein said first mixing and discharge portion defines a first mixing zone of said first stage, wherein said first aeration zone and said first mixing and discharge portion defines a first discharging zone of said first stage, and wherein said first sealed floor portion defines a first deaeration zone of said first stage;
    a second separator being comprised of a second aeration portion having second aeration and mixing openings, a second mixing and discharge portion having second mixing and discharge openings, and a second sealed floor portion, said second mixing and discharge portion being between said second sealed floor portion and said second aeration portion,
    wherein said second aeration portion defines a second aeration zone of said second stage, wherein said second mixing and discharge portion defines a second mixing zone of said second stage, wherein said second aeration zone and said second mixing and discharge portion defines a second discharging zone of said second stage, and wherein said second sealed floor portion defines a second deaeration zone of said second stage;
    a foam collector being positioned above said first separator so as to define a foam discharge zone;
    a first inlet orifice being in fluid connection with said first aeration zone;
    a first outlet orifice being in fluid connection with said first deaeration zone so as to flow material through said first stage from said first inlet orifice to said first outlet orifice;
    a second inlet orifice being in fluid connection with said second aeration zone and said first outlet orifice;
    a second outlet orifice being in fluid connection with said second deaeration zone so as to flow material through said second stage from said second inlet orifice to said second outlet orifice;
    a last outlet orifice being in fluid connection with said second outlet orifice so as to flow material through said enclosure.

2. The multistage flotation facility, according to claim 1, said enclosure defining a third stage below said second stage, the facility further comprising:
    a third separator being comprised of a third aeration portion having third aeration and mixing openings, a third mixing and discharge portion having third mixing and discharge openings, and a third sealed floor portion, said third mixing and discharge portion being between said third sealed floor portion and said third aeration portion,
    wherein said third aeration portion defines a third aeration zone of said third stage, wherein said third mixing and discharge portion defines a third mixing zone of said third stage, wherein said third aeration zone and said third mixing and discharge portion defines a third discharging zone of said third stage, and wherein said third sealed floor portion define a third deaeration zone of said third stage;
    a third inlet orifice being in fluid connection with said third aeration zone and said second outlet orifice;
    a third outlet orifice being in fluid connection with said third deaeration zone so as to flow material through said third stage from said third inlet orifice to said third outlet orifice, said last outlet orifice being in fluid connection with said second outlet orifice through said third outlet orifice so as to flow material through said enclosure.

3. The multistage flotation facility, according to claim 2, said enclosure defining a fourth stage below said third stage, the facility further comprising:
    a fourth separator being comprised of a fourth aeration portion having fourth aeration and mixing openings, a fourth mixing and discharge portion having fourth mixing and discharge openings, and a fourth sealed floor portion, said fourth mixing and discharge portion being between said fourth sealed floor portion and said fourth aeration portion,
    wherein said fourth aeration portion defines a fourth aeration zone of said fourth stage, wherein said fourth mixing and discharge portion defines a fourth mixing zone of said fourth stage, wherein said fourth aeration zone and said fourth mixing and discharge portion defines a fourth discharging zone of said fourth stage, and wherein said fourth sealed floor portion define a fourth deaeration zone of said fourth stage;
    a fourth inlet orifice being in fluid connection with said fourth aeration zone and said third outlet orifice;
    a fourth outlet orifice being in fluid connection with said fourth deaeration zone so as to flow material through said fourth stage from said fourth inlet orifice to said fourth outlet orifice, said last outlet orifice being in fluid connection with said second outlet orifice through said third outlet orifice and said fourth outlet orifice so as to flow material through said enclosure.

4. The multistage flotation facility, according to claim 1, wherein said first sealed floor portion has a length corresponding to 20% of a length of said first aeration portion and said first mixing and discharge portion.

5. The multistage flotation facility, according to claim 1, wherein said first sealed floor portion has a length greater than a distance between consecutive first aeration and mixing openings of said first mixing and discharge portion.

6. The multistage flotation facility, according to claim 1, wherein said first sealed floor portion has a length greater than twice a distance between consecutive first aeration and mixing openings of said first mixing and discharge portion.

7. The multistage flotation facility, according to claim 1, wherein a number of said first aeration and mixing openings and said first mixing and discharge openings is greater than a number of said second aeration and mixing openings and said second mixing and discharge openings.

8. The multistage flotation facility, according to claim 1, wherein said first stage is in fluid connection with said second stage through said first mixing and discharge openings.

9. The multistage flotation facility, according to claim 1, wherein said first aeration and mixing openings and said first mixing and discharge openings are offset from said second aeration and mixing openings and said second mixing and discharge openings.

10. The multistage flotation facility, according to claim 1, wherein said foam collector is comprised of foam collector openings, said foam discharge zone being in fluid connection with said first discharging zone so as to collect and discharge from said first stage.

11. The multistage flotation facility, according to claim 10, wherein said foam collector is inclined from an end of said enclosure with said first inlet orifice to an opposite end of said enclosure with said first outlet orifice.

12. The multistage flotation facility, according to claim 1, wherein said first aeration and mixing openings and said first mixing and discharge openings are offset from said second aeration and mixing openings and said second mixing and discharge openings.

13. The multistage flotation facility, according to claim 1, wherein first sealed floor portion is adjacent said first outlet orifice.

14. The multistage flotation facility, according to claim 1, said first sealed floor portion is shorter than said second sealed floor portion.

15. The flotation process for eliminating hydrophobic particles of a stream of materials to be treated, the process comprising the steps of:
    assembling a multistage flotation facility, according to claim 1;
    introducing a layer of materials into said enclosure through said first inlet orifice in said first stage;
    aerating said materials in said first aeration zone through said first aeration and mixing openings with air bubbles from said second stage;
    mixing said materials in said first mixing zone through said first mixing and discharge openings with air bubbles from said second stage;
    diffusing and dispersing said material in said first discharging zone;
    discharging through said foam collector from said first discharging zone;
    deaerating said materials in said first deaeration zone in a sealed relationship to said second stage so as to form first deaerated materials; and
    recovering said first deaerated materials at said first outlet orifice.

16. The flotation process for eliminating hydrophobic particles, according to claim 14, the process further comprising the steps of:
    injecting said first deaerated materials from said first outlet orifice through said second inlet orifice;
    aerating said first deaerated materials in said second aeration zone through said second aeration and mixing openings with air bubbles from a lower stage;
    mixing said first deaerated materials in said second mixing zone through said second mixing and discharge openings with air bubbles from said lower stage;
    diffusing and dispersing said first deaerated materials in said second discharging zone;
    deaerating said first deaerated materials in said second deaeration zone in a sealed relationship to said lower stage so as to form a second deaerated material; and
    recovering said second deaerated material at said second outlet orifice.

17. The flotation process for eliminating hydrophobic particles, according to claim 14, wherein a duration of the step of deaerating said materials in said first deaeration zone is at least 20% of a duration of the step of aerating said materials in said first aeration zone and the step of mixing said materials in said first mixing zone.

* * * * *